(12) United States Patent
Fu et al.

(10) Patent No.: US 11,802,791 B2
(45) Date of Patent: Oct. 31, 2023

(54) OPTICAL DEVICE METROLOGY SYSTEMS AND RELATED METHODS

(71) Applicant: Applied Materials, Inc., Santa Clara, CA (US)

(72) Inventors: Jinxin Fu, Fremont, CA (US); Kazuya Daito, Milpitas, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 31 days.

(21) Appl. No.: 17/456,421

(22) Filed: Nov. 24, 2021

(65) Prior Publication Data

US 2022/0163382 A1 May 26, 2022

Related U.S. Application Data

(60) Provisional application No. 63/117,585, filed on Nov. 24, 2020.

(51) Int. Cl.
*G01J 1/04* (2006.01)
*G01J 1/08* (2006.01)

(52) U.S. Cl.
CPC .......... *G01J 1/0459* (2013.01); *G01J 1/0425* (2013.01); *G01J 1/08* (2013.01)

(58) Field of Classification Search
CPC .......... G01J 1/0459; G01J 1/08; G01J 1/0425; G02B 5/1819; G02B 5/1852; G02B 27/0172; G02B 2027/0125; G02B 6/0038; G02B 6/0016
USPC ................................................ 356/432–440
See application file for complete search history.

(56) References Cited

U.S. PATENT DOCUMENTS

| | | | |
|---|---|---|---|
| 4,843,874 A | 7/1989 | Tsuyoshi et al. | |
| 7,068,363 B2 | 6/2006 | Bevis et al. | |
| 10,641,682 B2 | 5/2020 | Yang et al. | |
| 2002/0066545 A1 | 6/2002 | Karjanmaa | |
| 2019/0056593 A1* | 2/2019 | Bablumyan | G02B 27/44 |
| 2020/0256762 A1 | 8/2020 | Ozawa et al. | |
| 2020/0326177 A1 | 10/2020 | Rojo et al. | |

(Continued)

FOREIGN PATENT DOCUMENTS

| | | |
|---|---|---|
| JP | 07005118 A | 1/1995 |
| JP | 2006305426 A | 11/2006 |

OTHER PUBLICATIONS

International Search Report dated Mar. 18, 2022 for Application No. PCT/US2021/060585.

*Primary Examiner* — Hoa Q Pham
(74) *Attorney, Agent, or Firm* — Patterson + Sheridan, LLP (57) ABSTRACT

A method of optical device metrology is provided. The method includes providing a first type of light into a first optical device during a first time period; measuring a quantity of the first type of light transmitted from a first location on the top surface or the bottom surface during the first time period; coating at least a portion of an edge of the one or more edges with a first coating of optically absorbent material during a second time period that occurs after the first time period; providing the first type of light into the first optical device during a third time period that occurs after the second time period; and measuring a quantity of the first type of light transmitted from the first location on the top surface or the bottom surface during the third time period.

18 Claims, 7 Drawing Sheets

(56) References Cited

U.S. PATENT DOCUMENTS

2022/0221723 A1\* 7/2022 Gao ................. G02F 1/225
2022/0291083 A1\* 9/2022 Fu .................. G01M 11/35

\* cited by examiner

OPTICAL DEVICE METROLOGY SYSTEMS AND RELATED METHODS

CROSS-REFERENCE TO RELATED APPLICATIONS

This application claims benefit of U.S. provisional patent application Ser. No. 63/117,585, filed Nov. 24, 2020, which is hereby incorporated herein by reference.

BACKGROUND

Field

Embodiments of the present disclosure generally relate to optical devices for augmented, virtual, and mixed reality. More specifically, embodiments described herein provide for optical device metrology systems and methods of performing optical device metrology.

Description of the Related Art

Virtual reality is generally considered to be a computer-generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

Augmented reality devices use optical devices (e.g., waveguide combiners) to generate virtual images for the user. One such challenge is displaying a virtual image overlaid on an ambient environment. To overlay these virtual images, light generated by the device (e.g., HMD) is in-coupled into a waveguide combiner, propagated through the waveguide combiner, out-coupled from the waveguide combiner, and overlaid for the user to appear as though the virtual image is part of the ambient environment. Light is coupled into and out of waveguide combiners using surface relief gratings.

Often, light to be used for generating the virtual images strays from the intended path inside an optical device, such as waveguide combiner. For example, instead of propagating out of the outcoupling grating of a waveguide combiner, some light may propagate until reaching an edge of the optical device. This light may then transmit through the edge of the optical device or reflect back into the device resulting of a scattering of light at a variety of angles in the optical device. This light that transmits through the edge and the light that scatters inside the optical device can reduce the image quality seen by the user optical device. To reduce the negative effects of this light on the image quality, edges of the optical device can be coated (e.g., blackened) with an optically absorbent material. Conventional techniques have then analyzed the quality of images output by the optical device to determine which coatings are most effective, but this is challenging and does not always lead to selecting the best coating.

Accordingly, what is needed in the art methods and optical device metrology systems operable to measure the effectiveness of optically absorbent coatings applied to the edges of optical devices for reducing the transmission of undesired light.

SUMMARY

In one embodiment, a method a method of optical device metrology is provided. The method includes providing a first type of light into a first optical device during a first time period, the first optical device comprising a top surface, a bottom surface, and one or more edges connecting the top surface with the bottom surface; measuring a quantity of the first type of light transmitted from a first location on the top surface or the bottom surface during the first time period; coating at least a portion of an edge of the one or more edges with a first coating of optically absorbent material during a second time period that occurs after the first time period; providing the first type of light into the first optical device during a third time period that occurs after the second time period; and measuring a quantity of the first type of light transmitted from the first location on the top surface or the bottom surface during the third time period.

In another embodiment, a method of a method of optical device metrology is provided. The method includes a) providing a first type of light into a first optical device during a first time period, the first optical device comprising a top surface, a bottom surface, and one or more edges connecting the top surface with the bottom surface; b) measuring, by a first camera, a quantity of the first type of light transmitted from a first location on the top surface or the bottom surface during the first time period; c) coating at least a portion of an edge of the one or more edges with a first coating of optically absorbent material during a second time period that occurs after the first time period; d) providing the first type of light into the first optical device during a third time period that occurs after the second time period; and e) measuring, by the first camera, a quantity of the first type of light transmitted from the first location on the top surface or the bottom surface during the third time period.

In another embodiment, a method of optical device metrology is provided. The method includes a) providing a first type of light into a first optical device during a first time period, the first optical device comprising a top surface, a bottom surface, and one or more edges connecting the top surface with the bottom surface; b) measuring, by a first camera, a quantity of the first type of light transmitted from a first location on the top surface or the bottom surface during the first time period; c) measuring, by a second camera, a quantity of the first type of light transmitted from a first location on an edge of the one or more edges during the first time period; d) coating at least a portion of an edge of the one or more edges with a first coating of optically absorbent material during a second time period that occurs after the first time period; e) providing the first type of light into the first optical device during a third time period that occurs after the second time period; f) measuring, by the first camera, a quantity of the first type of light transmitted from the first location on the top surface or the bottom surface during the third time period g) measuring, by the second camera, a quantity of the first type of light transmitted from the first location on the edge of the one or more edges during the third time period; and h) determining the first coating or the second coating is better suited for absorbing light based on the measurements made during blocks b), c), f), and g) for the first optical device and the second optical device, wherein the measurements made by the first camera are weighted more heavily than the measurements made by the second camera for determining which coating is better suited.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices for augmented, virtual, and mixed reality. More specifically, embodiments described herein provide for methods and optical device metrology systems operable to measure the effectiveness of optically absorbent coatings applied to the edges of optical devices for reducing the transmission of undesired light. Used herein, light refers to the portion of the electromagnetic spectrum that is visible to humans. The optical devices to which the benefits of this disclosure apply include, but are not limited to, a waveguide combiner (e.g., an augmented reality waveguide combiner), a flat optical device (e.g., a metasurface), a surface relief grating-based waveguide combiner, a volume hologram-based waveguide combiner, a bird bath waveguide combiner, a partial reflective mirror array combiner, or a free from optics combiner. Furthermore, the use of the term coating is not meant to be limited as the benefits of this disclosure can apply to any technique used to block and/or absorb light at the edges of optical devices. For example, the benefits of this disclosure can apply to any material (e.g., a stain, an opaque piece of tape, etc.) added on or around the edges of the optical device.

Figure 1A:
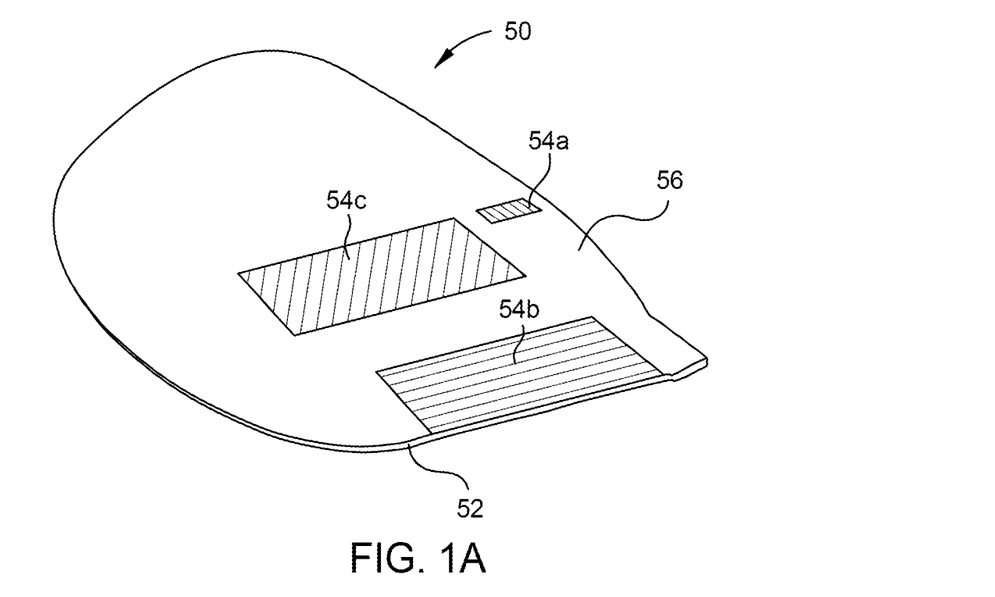
FIG. 1A is a perspective, frontal view of an optical device, according to one embodiment.

FIG. 1A is a perspective, frontal view of an optical device 50, according to one embodiment. The optical device 50 as depicted is a waveguide combiner. It is to be understood that the optical device 50 described herein is an exemplary optical device and other optical devices may benefit the advantages provided from this disclosure. The optical device 50 can include a plurality of optical device structures formed on a substrate 56. The substrate 56 can be a transparent substrate. The optical device structures may be nanostructures having sub-micron dimensions, e.g., nano-sized dimensions. In the optical device 50, these optical device structures include a plurality of gratings 54. These gratings 54 can include a first grating 54a, a second grating 54b, and a third grating 54c.

The first grating 54a can be an input coupling grating for the optical device 50. The second grating 54b can be an intermediate grating for the optical device 50. The third grating 54c can be an output coupling grating for the optical device 50. Other optical devices that can benefit from this disclosure can include a variety of optical device structures, and these optical device structures may be angled or binary. Furthermore, these optical device structures may have other cross-sections including, but not limited to, circular, triangular, elliptical, regular polygonal, irregular polygonal, and/or irregular shaped cross-sections.

The optical device 50 can be used for augmented reality applications. During use of the optical device 50 in a finished product, incoming light for an augmented reality (AR) image is provided to the first grating 54a. The light for the AR image is then propagated from the first grating 54a to the second grating 54b. Subsequently, the light for the AR image is propagated from the second grating 54b to the third grating 54c after which the light for the AR image can be output from the third grating 54c for the user to see.

Some light provided to optical devices (e.g., optical device 50) strays from the intended path inside the device. For example, light provided to the optical device 50 is generally intended be transmitted along a path from the input coupling grating 54a, through the intermediate grating 54b, and to the output coupling grating 54c without reaching the edges 52 of the optical device 50. However, in some instances a fraction of light reaches the edges 52 of the optical device 50.

Upon reaching the edge 52, portions of the light can then be (1) transmitted through the edge 52, (2) reflected back through the interior of the optical device 50 at a variety of angles, or (3) absorbed at the edge 52. The light that transmits through the edge 52 and the light that reflects back from the edge 52 both reduce the quality of images generated by the optical device 50.

Figure 1B:
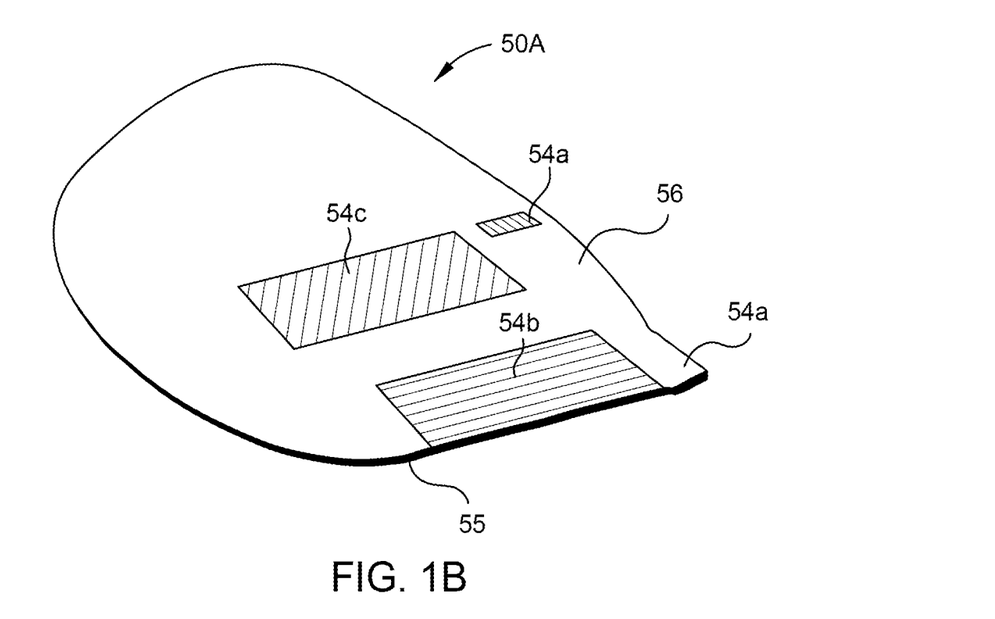
FIG. 1B is a perspective, frontal view of an edge-coated optical device, according to one embodiment.

To reduce the amount of light transmitted through the edges 52 and the amount of light reflected back into the optical device 50 by the edges 52, the edges 52 of the optical device 50 can be coated with a coating of optically absorbent material. FIG. 1B is a perspective, frontal view of an edge-coated optical device 50A (also referred to as coated waveguide combiner), according to one embodiment. The optical device 50A of FIG. 1B is the same as the optical device 50 of FIG. 1A except that the edge 52 from the optical device 50 of FIG. 1A has been coated (e.g., blackened) to form the coated edge 55. The coated edge 55 can reduce the amount of light that is transmitted through the coated edge 55 compared to the uncoated edge 52.

Furthermore, the coated edge 55 can reduce the amount of light that is reflected back from the coated edge 55 compared to the uncoated edge 55. Although coated edges, such as the coated edge 55, can improve the image quality output from a waveguide combiner, there can be variability of the effectiveness of the different coatings used for the coated edge. Consequently, it can be challenging to determine which coating should be used for which optical device. Conventional methods have generally focused on analyzing the quality of images or other light intended to be output by the optical devices. For example, for a waveguide combiner the quality of the image output by the output coupling grating 54c has conventionally been analyzed when comparing the performance of different optically absorbent coatings, but there are numerous variables that can affect the quality of the image provided by the output coupling grating 54c. In response to these problems, the following systems and methods are proposed.

Figure 2A:
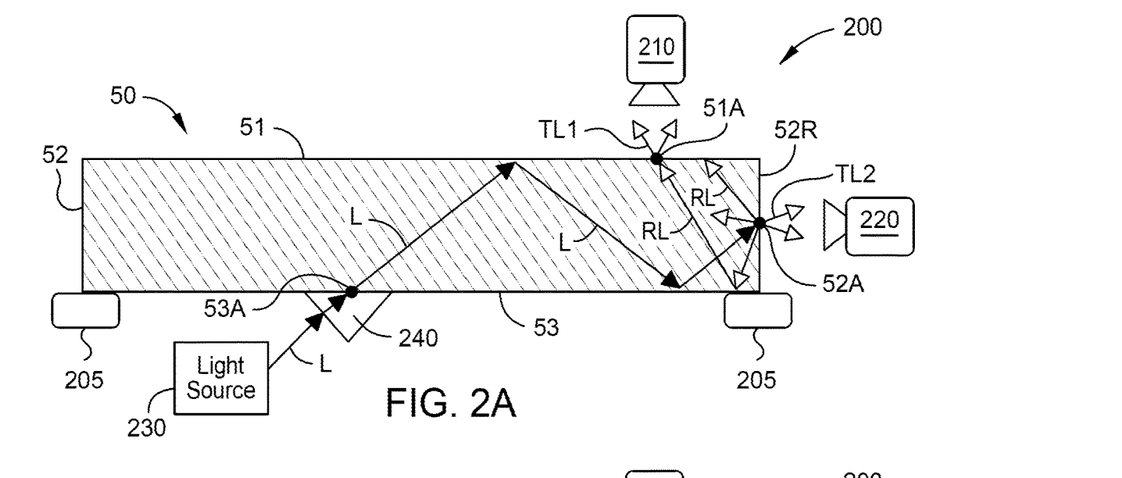
FIGS. 2A and 2B are schematic views of a metrology system, according to one embodiment.
Figure 2B:
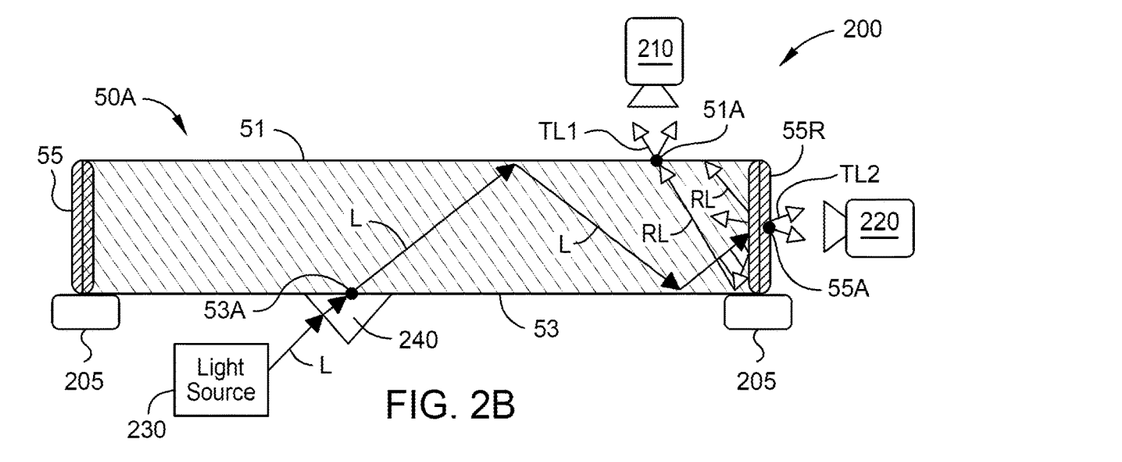

FIGS. 2A and 2B are schematic views of a metrology system 200, according to one embodiment. The metrology system 200 is operable to provide light to an optical device (e.g., optical device 50) and to take measurements of light transmitted from the optical device. A side cross-sectional view of the uncoated optical device 50 (see also FIG. 1A) is shown in FIG. 2A. A side cross-sectional view of the edge-coated optical device 50A (see also FIG. 1B) is shown in FIG. 2B.

The metrology system 200 includes a support 205, a first camera 210, a second camera 220, a light source 230, and a prism 240. The optical device 50 includes the edges 52, a bottom surface 53 and a top surface 51. The edges 52 connect the top surface 51 with the bottom surface 53. The bottom surface 53 of the optical device 50 can be positioned on the support 205. The support 205 can have a shape (e.g., a ring shape) that is similar to the perimeter of the optical device 50, so that most of the bottom surface 53 of the optical device 50 is exposed to allow for providing light into the optical device 50 or for taking measurements of light transmitting from the bottom surface 53 of the optical device 50. In other embodiments, a transparent support can be used to support an optical device, such as the optical device 50.

The first camera 210 is directed at a location 51A on a top surface 51 of the optical device 50. The second camera 220 is directed at a location 52A on a right edge 52R of the optical device 50. The location 51A, 52A can be located away from locations where the optical device is designed to output light. For example, the location 51A on the top surface 51 can be located away from the output coupling grating 54c (see FIG. 1A) for the optical device 50. The optical device 50 is not designed to transmit light through the edge 52. For optical devices designed to transmit light through the edge, the location at which the second camera 220 is directed would be located away from the location(s) on the edge where the optical device is designed to transmit light.

Light L (e.g., blue light) is transmitted from the light source 230. In the following description, the light L provided by the light source 230 is described separately from reflected/scattered light and light transmitting from the optical device 50. To aid this description the light L is identified in the Figures with a filled-in black arrowhead while the reflected/scattered light RL and the transmitted light TL1, TL2 are identified in the Figures with an unfilled arrowhead.

Light L is transmitted from the light source 230 to the prism 240. The prism 240 is positioned against the bottom surface 53 and is centered around a location 53A on the bottom surface 53. In one embodiment, the light source 230 is a laser. In one of these embodiments, the light source 230 is a blue laser due to the increased amount of light scattering associated with blue light. In other embodiments, the light source 230 is operable to provide different wavelengths of light at separate times (e.g., blue light only, followed by red light only) or simultaneously (e.g., blue light and red light at the same time). The cameras 210, 220 can then take measurements for each type of light provided by the light source 230.

The prism 240 is used to couple the light L from the light source 230 into the interior of the optical device 50. Inside the optical device 50, the light L undergoes total internal reflection until the light L reaches the right edge 52R. Upon reaching the right edge 52R, some of the light L transmits through the right edge 52R towards the second camera 220 as transmitted light TL2. The second camera 220 can take measurements of this transmitted light TL2.

Other portions of the light L are reflected back through the interior of the optical device 50 as reflected light RL. This reflected light RL can be scattered at a variety of angles through the interior of the optical device 50. Then different portions of this scattered, reflected light RL then encounter different surfaces of the optical device 50 at a variety of locations, such as the location 51A on the top surface 51 of the optical device 50. After encountering a location on the one of the surfaces (e.g., location 51A on the top surface 51), the reflected light RL then either reflects again or transmits away from the optical device 50 as transmitted light TL1. For example, FIG. 2A shows some of the transmitted light TL1 transmitting towards the first camera 210. The first camera 210 can take measurements of this transmitted light TL1 that transmits from the top surface 51 at and around the location 51A (i.e., within the field of view of the first camera 210).

In some embodiments, the location 51A is a location other than a location on the optical device 50 where light is designed to be output. For example, the optical device 50 includes the output coupling grating 54C (see FIG. 1A), which is a location designed to output light. Thus, in an embodiment in which the output coupling grating 54c is the only location on the optical device 50 designed to output light, then the location 51A is a location positioned away from the output coupling grating 54c, so that the light measured by the camera 210 is not the light that the optical device 50 is designed to output.

The shape of the edge 52 can also have an effect on the reflecting and scattering of light back through the interior of the optical device 50. For example, a rounded edge may reflect more or less light than a straight edge. Additionally, a rounded edge may reflect light to different locations in the interior of an optical device (e.g., optical device 50) than a straight edge. A jagged edge may cause more scattering than a straight edge or a rounded edge. In some embodiments, an edge of an optical device (e.g., edge 52 of optical device 50) is modified to make the edge more jagged or rough to increase the scattering of light back through the interior of the optical device. Increased scattering of light can help amplify how the different optically absorbent coatings can have different effects on reducing the transmission of light through undesired portions of an optical device, such as the locations 51A, 52A shown in FIG. 2A.

The optical device 50A of FIG. 2B is the same as the optical device 50 of FIG. 2A except that the edge 52 from the optical device 50 of FIG. 2A has been coated to form the coated edge 55. The coated edge 55 can reduce the amount of light that is transmitted through the coated edge 55 compared to the uncoated edge 52 when a same amount of light is incident upon both of the edges the 52, 55 from the interior of the respective optical devices 50, 50A. For example, when the light source 230 provides an identical amount of light L to the optical devices 50, 50A, then the second camera 220 measures less transmitted light TL2 when the edge-coated optical device 50A is on the support 205 receiving the light L than when the uncoated optical device 50 is on the support 205 receiving the same amount of light L due to the coated edge 55 absorbing and otherwise blocking the light L from transmitting from the edge as the transmitted light TL2.

Furthermore, the coated edge 55 can also reduce the amount of light L that is reflected back from the coated edge 55 compared to the uncoated edge 55 when an identical amount of light L is incident upon both of the edges 52, 55 from the interior of the respective optical devices 50, 50A. For example, when the light source 230 provides an identical amount of light L to the optical devices 50, 50A, then the first camera 210 measures less transmitted light TL1 when the edge-coated optical device 50A is on the support 205 receiving the light L than when the optical device 50 is on the support 205 receiving the same amount of light L due to the coated edge 55 absorbing and otherwise blocking the light L from reflecting and later transmitting as the transmitted light TL1.

Figure 2C:
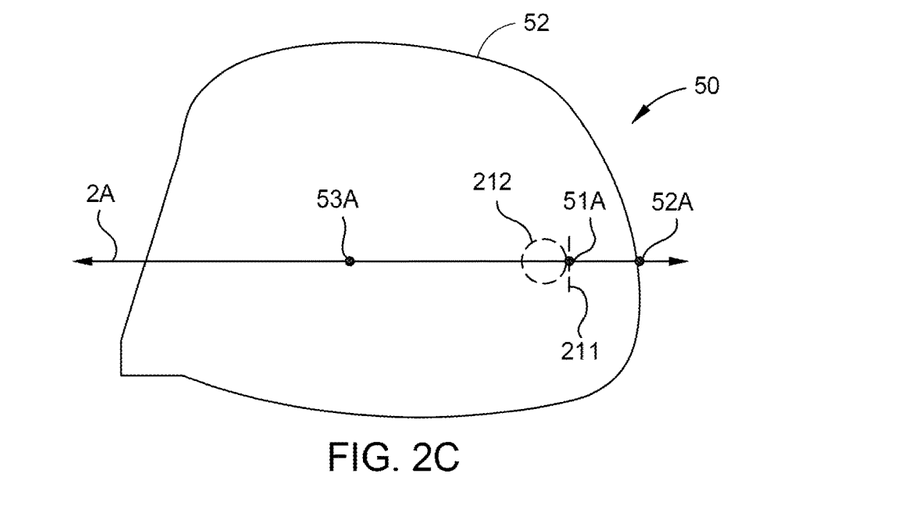
FIG. 2C is a top view of an optical device showing locations on the optical device discussed above in reference to FIGS. 2A and 2B.

FIG. 2C is a top view of the optical device 50 showing locations on the optical device 50 discussed above in reference to FIGS. 2A and 2B. FIG. 2C includes a reference line 2A showing the location at which the cross-sectional view is taken for FIG. 2A. The same view along reference line 2A is used for the cross-sectional view of FIG. 2B after the coated edges 55 are formed. FIG. 2C shows the top-view location for (1) the location 53A on the bottom surface 53 for where the light L enters the optical device 50, (2) the location 51A on the top surface 51 for where the transmitted light TL1 transmits towards the first camera 210, and (3) the location 52A on the right edge 52R for where the transmitted light TL2 transmits towards the second camera 220.

Also shown in FIG. 2C are a straight-line path 211 and a circular path 212. These paths 211, 212 can correspond to paths over which the first camera 210 can move or otherwise separately view when taking measurements of light transmitted from the top surface 51. The first camera 210 can be operable to take numerous measurements along the paths 211, 212 (e.g., ten or more, hundred or more, etc.). Taking measurements from more than one location (e.g., location 51A) can be used to obtain more data, which may be helpful in determining the relative effectiveness of different coatings applied to the optical devices, such as the optical device 50. In some embodiments, the second camera 220 is also operable to view different locations on the edge 52 of the optical device 50. Although a straight-line path 211 and a circular path 212 are shown, paths having any other shape including irregular shapes can also be used. Furthermore, measurements by the cameras (e.g., first camera 210) can also be further away from each other than shown on the paths 211, 212.

Figure 3A:
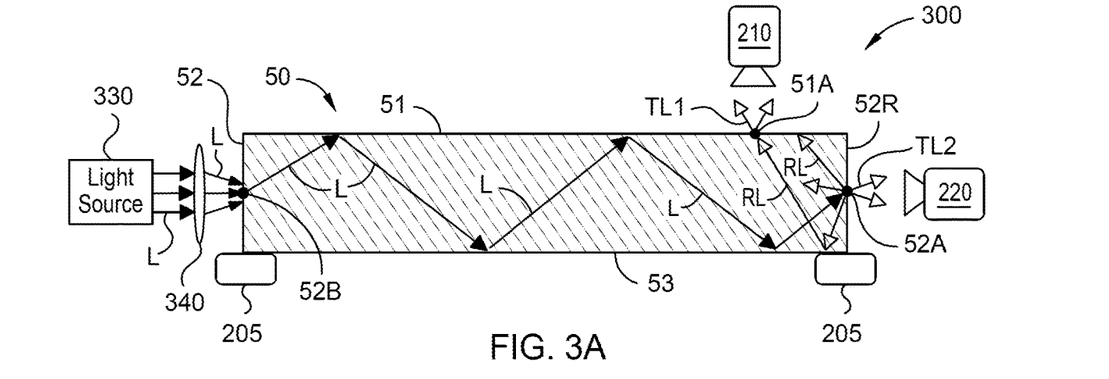
FIGS. 3A and 3B are schematic views of a metrology system, according to another embodiment.
Figure 3B:
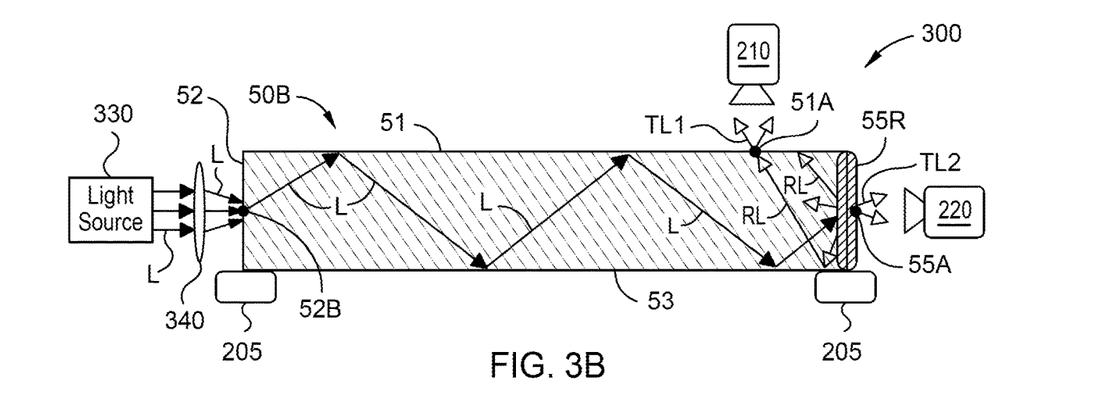

FIGS. 3A and 3B are schematic views of a metrology system 300, according to another embodiment. The metrology system 300 is the same as the metrology system 200 (see FIGS. 2A, 2B) described above except that the metrology system 300 includes different equipment for providing the light L into the optical device 50 through the edge 52 rather than providing the light L through the bottom surface 53 of the optical device 50 as described above in reference to the metrology system 200.

In FIG. 3A, the optical device 50 described above in reference to FIGS. 1A and 2A is again shown on the support 205. In FIG. 3B, a coated optical device 50B is shown on the support 205. The coated optical device 50B is the same as the coated optical device 50A (see FIG. 1B, 2B) described above except that at least a portion of the edge 52 of the optical device 50B remains uncoated. This uncoated portion can include a location 52B on an edge 52 where the light L is provided into the optical device 50B.

The metrology system 300 includes a light source 330 and a lens 340. In some embodiments, the light source 330 is the same as the light source 230 discussed above. The lens 340 is used to focus the light L from the light source 330 onto the uncoated location 52B on the edge 52 of the optical device 50. After the light L enters the respective optical devices 50, 50A, the light L undergoes total internal reflection until the light L reaches the right edge 52R (FIG. 3A), 55R (FIG. 3B). After the light L reaches the respective edges, the first camera 210 and the second camera 220 can make the same measurements of the corresponding transmitted light TL1, TL2 both before coating the edges 52 (see FIG. 3A) and after coating the edges (e.g., edge 55R)(see FIG. 3B).

Figure 3C:
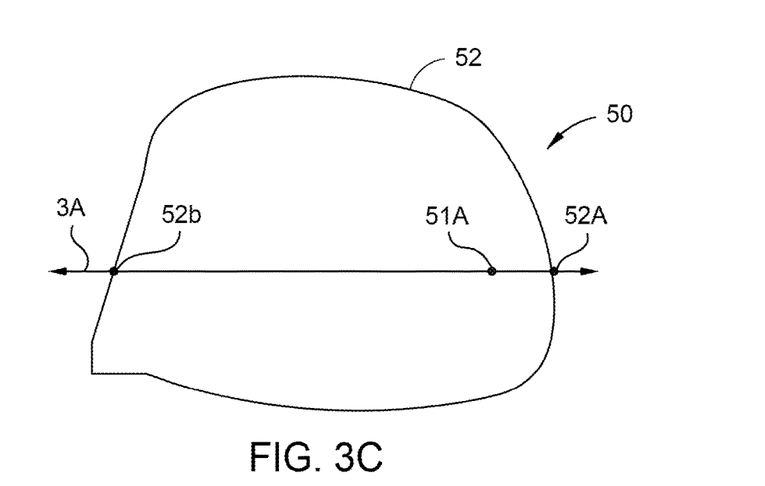
FIG. 3C is a top view of an optical device showing locations on the optical device discussed above in reference to FIGS. 3A and 3B.

FIG. 3C is a top view of the optical device 50 showing locations on the optical device 50 described above in reference to FIGS. 3A and 3B. FIG. 3C includes a reference line 3A showing the location where the cross-sectional view is taken for FIG. 3A. The same view along reference line 3A is used for the cross-sectional view of FIG. 3B after the coated edges 55 are formed. FIG. 3C shows the top-view location for (1) the location 52B on the edge 52 for where the light L enters the optical device 50, (2) the location 51A on the top surface 51 for where the transmitted light TL1 transmits towards the first camera 210, and (3) the location 52A on the right edge 52R for where the transmitted light TL2 transmits towards the second camera 220.

Figure 4A:
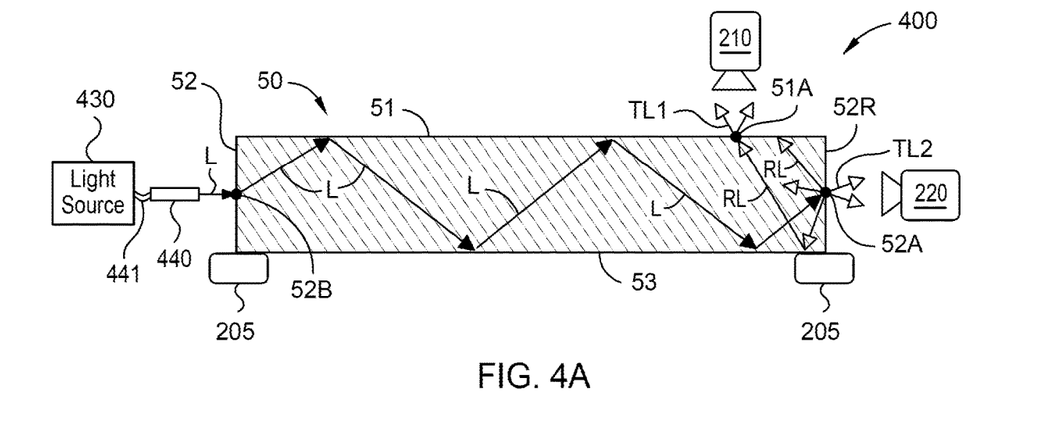
FIGS. 4A and 4B are schematic views of a metrology system, according to another embodiment.
Figure 4B:
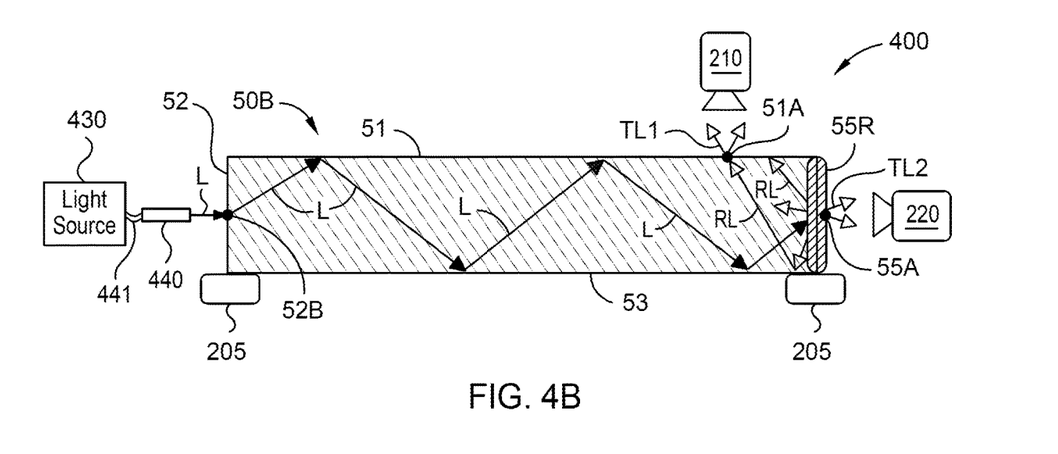

FIGS. 4A and 4B are schematic views of a metrology system 400, according to another embodiment. The metrology system 400 is the same as the metrology system 300 (see FIGS. 3A, 3B) described above except that the metrology system 400 includes different equipment for providing the light L into the optical device 50 through the edge 52. The same optical devices 50, 50B are shown on the support 205 in the respective FIGS. 4A, 4B as were shown in FIGS. 3A, 3B. As described above, the optical device 50B includes an uncoated portion for the location 52B on the edge 52 where the light L is provided into the optical device 50B.

The metrology system 400 includes a light source 430, a fiber optic head 440, and a cable 441 connecting the light source 430 with the fiber optic head 440. In some embodiments, the light source 430 is the same as the light sources 230, 330 described above.

A top view of the optical device 50 is not shown for the metrology system 400 as this would be the same view as shown in FIG. 3C due to the light L entering at the same location 52B and the transmitted light TL1, TL2 also being measured by the respective cameras 210, 220 at the same locations 51A, 52A in both metrology systems 300, 400.

Figure 5A:
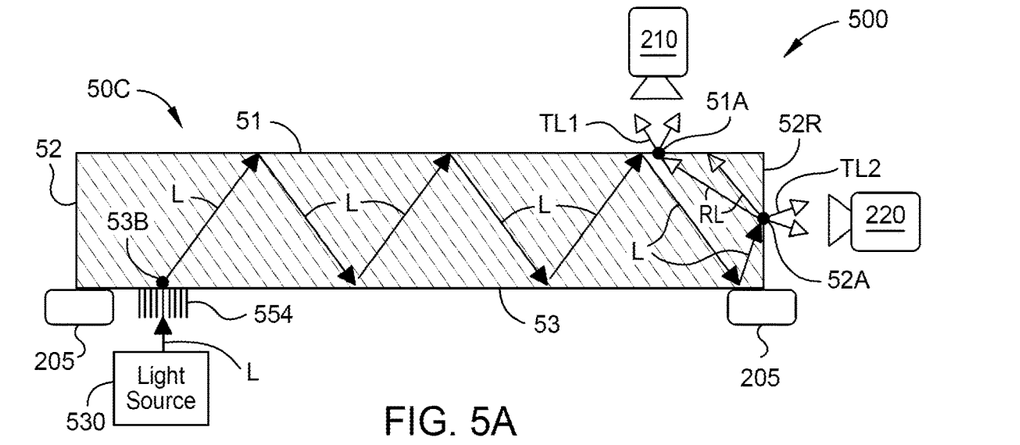
FIGS. 5A and 5B are schematic views of a metrology system, according to another embodiment.
Figure 5B:
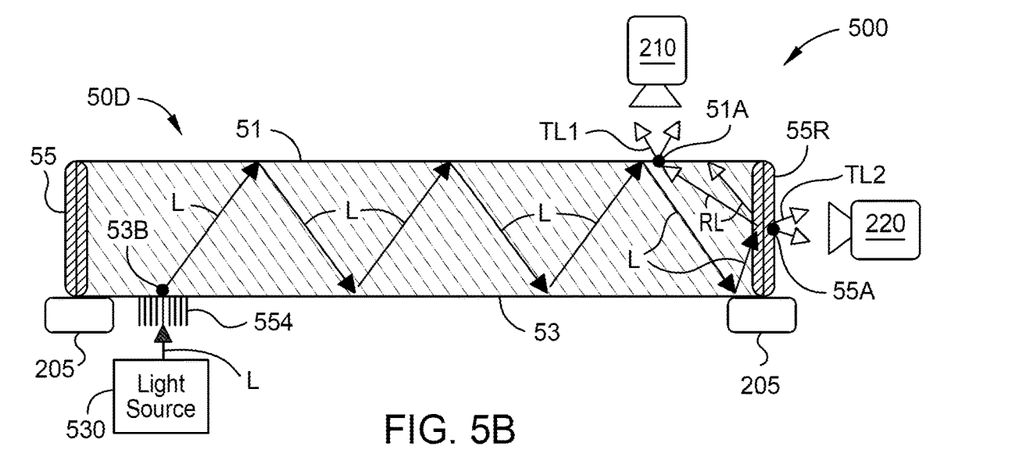

FIGS. 5A and 5B are schematic views of a metrology system 500, according to another embodiment. The metrology system 500 is the same as the metrology system 200 (see FIGS. 2A, 2B) described above except that the metrology system 500 includes different equipment for providing the light L into the optical device 50 through the bottom surface 53 of the optical device 50.

In FIG. 5A, an optical device 50C is shown on the support 205. The optical device 50C is the same as the optical device 50 described above except that the optical device 50C includes a grating 554. The grating 554 can be an additional grating not included in the optical device 50 (see e.g., FIG. 1A) that included the gratings 54*a-c*. Alternatively, the grating 554 can be in a different position, but otherwise the same as one of the gratings 54*a-c* described above. The grating 554 can be used to couple light provided by the metrology system 500 into the optical device 50C. In FIG. 5B, an optical device 50D is shown on the support 205. The optical device 50D is the same as the optical device 50C except that the edge 52 of the optical device 50C has been coated for the optical device 50D to form the coated edge 55.

The metrology system 500 includes a light source 530 and the grating 554. In some embodiments, the light source 530 is the same as the light source 230 described above. The grating 554 is used to couple the light L from the light source 530 into the optical devices 50C, 50D. The grating 554 is centered around a location 53B on the bottom surface 53 of the optical devices 50C, 50D. After the light L enters the respective optical devices 50C, 50D, the light L undergoes total internal reflection until the light L reaches the right edge 52R (FIG. 5A), 55R (FIG. 5B). After the light L reaches the respective edges, the first camera 210 and the second camera 220 can make the same measurements of the corresponding transmitted light TL1, TL2 both before coating the edges 52 (see FIG. 5A) and after coating the edges 55 (see FIG. 5B).

Figure 5C:
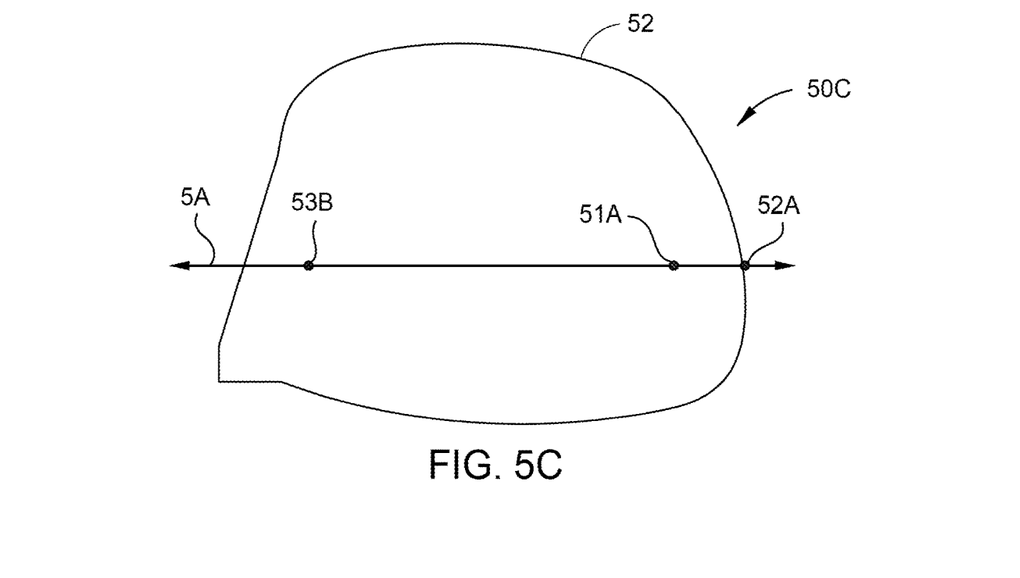
FIG. 5C is a top view of an optical device showing locations on the optical device discussed above in reference to FIGS. 5A and 5B.

FIG. 5C is a top view of the optical device 50C showing locations on the optical device 50C described above in reference to FIGS. 5A and 5B. FIG. 5C includes a reference line 5A showing the location where the cross-sectional view is taken for FIG. 5A. The same view along reference line 5A is used for the cross-sectional view of FIG. 5B after the coated edges 55 are formed. FIG. 5C shows the top-view location for (1) the location 53B on the bottom surface 53 for where the light L enters the optical device 50C, (2) the location 51A on the top surface 51 for where the transmitted light TL1 transmits towards the first camera 210, and (3) the location 52A on the right edge 52R for where the transmitted light TL2 transmits towards the second camera 220.

Figure 6:
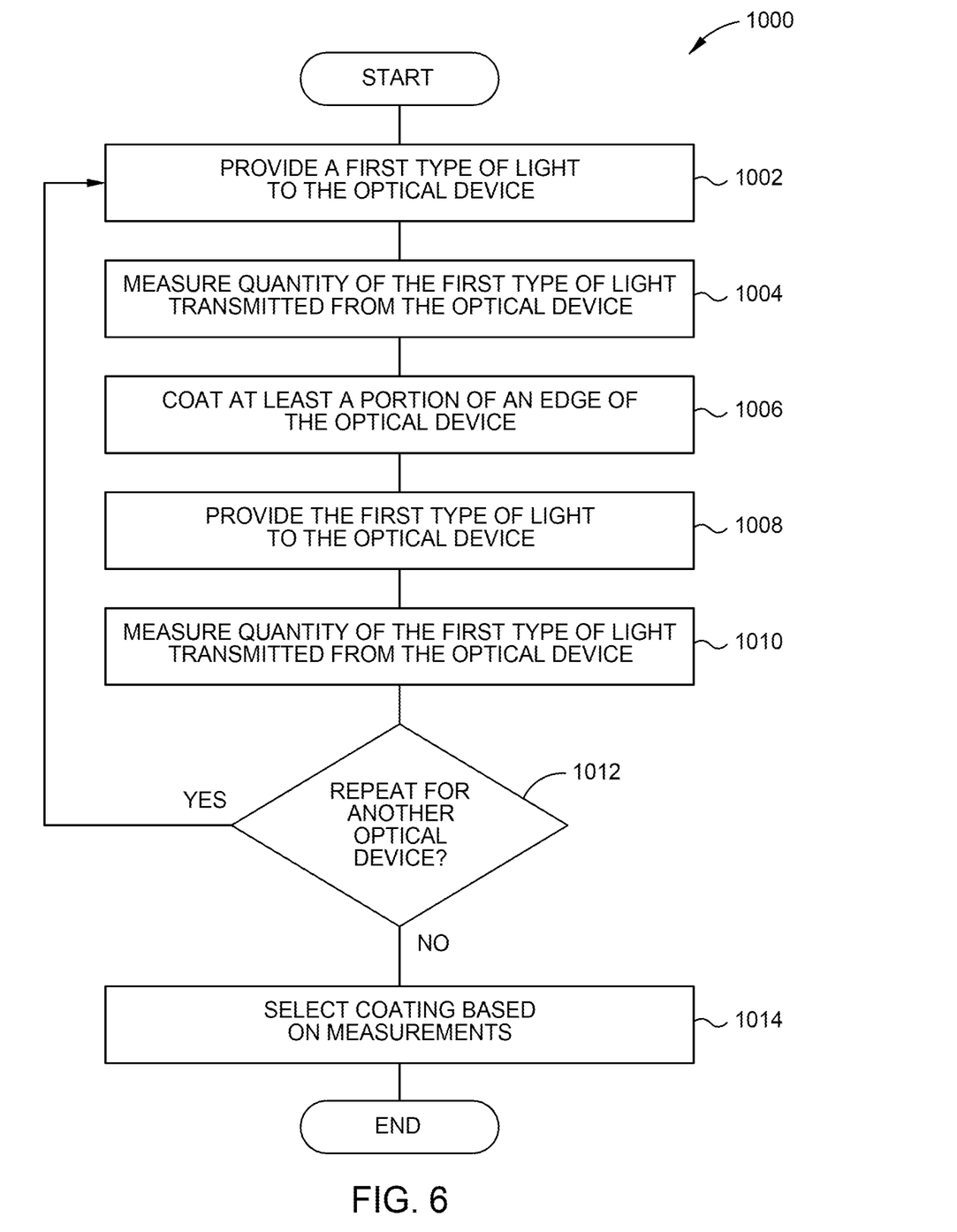
FIG. 6 is a process flow diagram of a method for measuring light transmitted from an optical device, according to one embodiment.

FIG. 6 is a process flow diagram of a method 1000 of performing optical device metrology, according to one embodiment. The method 1000 is described as being performed on the optical device 50 and similar optical devices, but the method can be applied to any optical device in which an edge is coated (e.g., blackened). As described above, the optical device 50 includes the top surface 51, the bottom surface 53, and one or more edges 52 connecting the top surface 51 with the bottom surface 53.

The method begins at block 1002. At block 1002, a first type of light can be provided into the optical device 50 from a light source during a first time period. For example, the first type of light can be blue light. With reference to FIG. 2A the first type of light can be provided into the optical device 50 from the light source 230 through the prism 240. With reference to FIG. 3A, the first type of light can be provided into the optical device 50 from the light source 330 through the lens 340. With reference to FIG. 4A, the first type of light can be provided into the optical device 50 from the light source 430 through the fiber optic head 440. With reference to FIG. 5A, the light can be provided into the optical device 50 from the light source 530 through the grating 554. In some embodiments, each of the light sources 230, 330, 430, 530 can be a light source operable to provide the first type of light, such as a blue laser. In other embodiments, the light sources can be operable to provide more than one type of light (e.g., blue light and red light) or multiple light sources can be used that can each provide a different type of light. In some of these embodiments, the different types of light can be provided separately (e.g., blue light only, followed by red light only) or simultaneously (e.g., blue light and red light at the same time. Multiple types of light can also be provided each time light is provided to an optical device, for example after the edges of the optical device are coated, so that the same type of measurements can be performed before and after edge coating as well as on optical devices that have different coatings.

At block 1004, a quantity of the first type of light (e.g., blue light) transmitted from a first location on the top surface and/or the bottom surface is measured during the first time period at a same time that the light is provided at block 1002. For example, with reference to FIGS. 2A, 3A, 4A, and 5A, the first camera 210 can be used to measure a quantity of blue light transmitted from the first location 51A on the top surface 51 of the optical device 50 during the first time period. Although not shown, another camera can be placed below the bottom surface 53 to make similar measurements as the first camera 210 that measures the quantity of light transmitting from the top surface 51 at the first location 51A.

Additionally, at block 1004, a quantity of the first type of light (e.g., blue light) transmitted through a location on an edge 52 can also be measured during the first time period at a same time that the light is provided at block 1002. For example, with reference to FIGS. 2A, 3A, 4A, and 5A, the second camera 220 can be used to measure a quantity of blue light transmitted through the location 52A on the edge 52 of the optical device 50 during the first time period. The measurements made at block 1004 can be used as a reference for comparison to similar measurements after at least a portion of an edge 52 of the optical device 50 is coated.

In some embodiments, the first camera 210 and the second camera 220 can move to enable the cameras 210, 220 to take measurements from more than one location on the top surface 51 or the edge 52. In one embodiment, the movable cameras can move along a straight line (see e.g., path 211 in FIG. 2C), a partial or full circular line (see e.g., circular path 212 in FIG. 2C), or other path having a different shape. Moving the camera can refer to cameras with pan and tilt functionality as well as cameras in which the entire camera is movable, for example along a track. In other embodiments, a support (e.g., support 205) on which the optical device 50 is positioned is moved to enable the cameras 210, 220 to take measurements of different portions of the top surface 51 and the edges 52 of the optical device 50. Taking measurements from more than one location on the top surface 51, bottom surface 53, and/or edges 52 can help achieve more useful results if there is significant variation in the light transmitted from different locations on the top surface 51, bottom surface 53, or edges 52 of the optical device 50. These measurements at the different locations on the top surface 51, bottom surface 53, and/or edges 52 can be repeated at block 1010 if performed at block 1004, so that each measurement at block 1004 has a corresponding measurement at block 1010.

Alternatively, in some embodiments, one or more of the first camera 210 and the second camera 220 can be replaced with multiple cameras arranged along a path, such as the straight-line path (see e.g., path 211 in FIG. 2C), a partial or full circular path (see e.g., circular path 212 in FIG. 2C), or a path having a different shape to enable more measurements of the top surface 51 and/or edges 52 to be made. In one embodiment, instead of multiple cameras, one or more of the first camera 210 and the second camera 220 include multiple input heads (e.g., fiber optic input heads) to enable the additional measurements of the top surface 51 and/or edges 52 to be made.

At block 1006, at least a portion of an edge 52 of the one or more edges 52 of the optical device 50 are coated (e.g., darkened, such as blackened) with a first coating of an optically absorbent material during a second time period. The second time period can begin after the first time period has ended. In some embodiments, all of the edges 52 are coated with the coating of optically absorbent material, for example as shown in FIG. 2B. In some embodiments, in which the light is provided into the optical device 50 through a portion of the edge 52 at block 1002 (see e.g., FIG. 3A and FIG. 4A), then at least this portion of the edge 52 can remain un-coated at block 1006.

At block 1008, the first type of light can be provided into the coated waveguide combiner (e.g., coated optical device 50A, 50B) from a light source during a third time period. The third time period can begin after the second time period has ended. At block 1008, the light is provided in the same way that the light was provided at block 1002. For example, with reference to FIG. 2A, if the light was provided from the light source 230 through the prism 240 centered around the location 53A on the bottom surface 53 of optical device 50 at block 1002, then the light is provided from the light source 230 through the prism 240 centered around the location 53A on the bottom surface 53 of optical device 50A at block 1008. All aspects of the light provided are to remain the same at blocks 1002, 1008. For example, if the light source 230 is a laser, then the power provided to the laser, the duty cycle of the laser, the wavelength of light output by the laser, and any other settings associated with the light source 230 should remain the same at blocks 1002, 1008. By having the same light provided to the respective optical devices 50, 50A at blocks 1002, 1008, a more accurate effect of the coated edge 55 can be determined.

At block 1010, the same measurements performed at block 1004 on the optical device 50 are performed again on the coated optical device (e.g., optical devices 50A, 50B) during the third time period at a same time that the light is provided at block 1008. The quantity of the first type of light (e.g., blue light) transmitted from a first location on the top surface and/or the bottom surface of the coated optical device is measured during this third time period. For example, with reference to FIGS. 2A, 3A, 4A, and 5A, the first camera 210 can be used to measure a quantity of blue light transmitted from the first location 51A on the top surface 51 of the optical device 50A, 50B, 50D during the third time period.

Additionally, at block 1010, a quantity of the first type of light (e.g., blue light) transmitted from a location on an edge can also be measured during the third time period at a same time that the light is provided at block 1008. For example, with reference to FIGS. 2A, 3A, 4A, and 5A, the second camera 220 can be used to measure a quantity of blue light transmitted from the location 55A on the edge 55 of the coated optical device (e.g., coated optical device 50A, 50B, 50D) during the third time period. The measurements made at block 1010 can then be analyzed to determine the effectiveness of the coated edge 55 on reducing the amount of light transmitted from the edge and the amount of light transmitted from other undesired locations, such as the first location 51A on the top surface 51.

At block 1012 a determination is made on whether to repeat blocks 1002-1010 on another optical device, such as the optical device 50. Often, block 1002-1010 are repeated at least once, so that the performance of at least two different edge-darkening coatings can be analyzed. Blocks 1002-1010 can be repeated for each different coating to be analyzed. In some embodiments, the different coatings can have differences that include but are not limited to different materials, different thicknesses, and different opacity. When repeating blocks 1002-1010, an identical version (e.g., same size, shape, material, etc.) of uncoated waveguide combiner (e.g., optical device 50) used during the first execution of blocks 1002-1010 can be used during the second and each subsequent execution of blocks 1002-1010 for coatings that are going to be compared to each other. In some embodiments, blocks 1002-1004 can be skipped if there is not likely to be significant variation between the measurements performed on the uncoated optical devices.

At block 1014, generally performed after repeating blocks 1002-1010 at least once, a selection of a better-suited coating can be made. For example, if two coatings are tested and the measurements made at blocks 1004 and 1010 show that a first coating measured on a first execution of blocks 1002-1010 is better suited as optically absorbent coating than a second coating measured on a second execution of blocks 1002-1010, then a selection of the first coating can be made.

Determining which edge-darkening coating is better suited can be based on a number of metrics. For example, in one embodiment, the coating that provided the largest reduction in the first type of light (e.g., blue light) between the measurements at block 1010 compared to the measurements at block 1004 can be determined to be better suited for absorbing light. In another embodiment, the coating for which the lowest amount of the first type of light (e.g., blue light) for the measurements at block 1010 can be determined to be better suited for absorbing light. This better-suited coating can be selected as the coating for the optical device, for example in larger production run, for example for use in a finished product. In some embodiments, measurements from both the first camera 210 and the second camera 220 can be used to determine this reduction. In some of these embodiments, a higher weighting factor can be placed on the amount of light reduced through the non-edge surface (e.g., the top surface 51) relative to the light reduced through the edge 52. In other embodiments, only the measurement from the first camera 210 measuring the light transmitting through the top surface 51 is used in determining the better coating.

Although the method 1000 is described as performing the measurements at blocks 1004 and 1010 on the exact same optical device before edge coating (block 1004) and after edge coating (block 1010), this is not required. For example, a standard uncoated optical device can be used for measurements at block 1004, and then numerous coated optical devices can be measured when block 1010 is executed. Furthermore, in some embodiments, block 1004 can be performed once, and then block 1010 can be performed numerous times (e.g., ten times, one hundred times or more) on coated optical devices.

Although the method 1000 was described as being performed on a single waveguide combiner that receives a first coating and then repeated for a second waveguide combiner that receives a second coating, this disclosure also envisions analyzing multiple optical devices simultaneously. For example, with multiple light sources (e.g., light source 230 of FIG. 2A) and multiple sets of cameras (e.g., the first camera 210 and the second camera 220), multiple uncoated waveguide combiners could be analyzed at block 1004 simultaneously and multiple coated waveguide combiners could be analyzed at block 1010 simultaneously.

Figure 7:
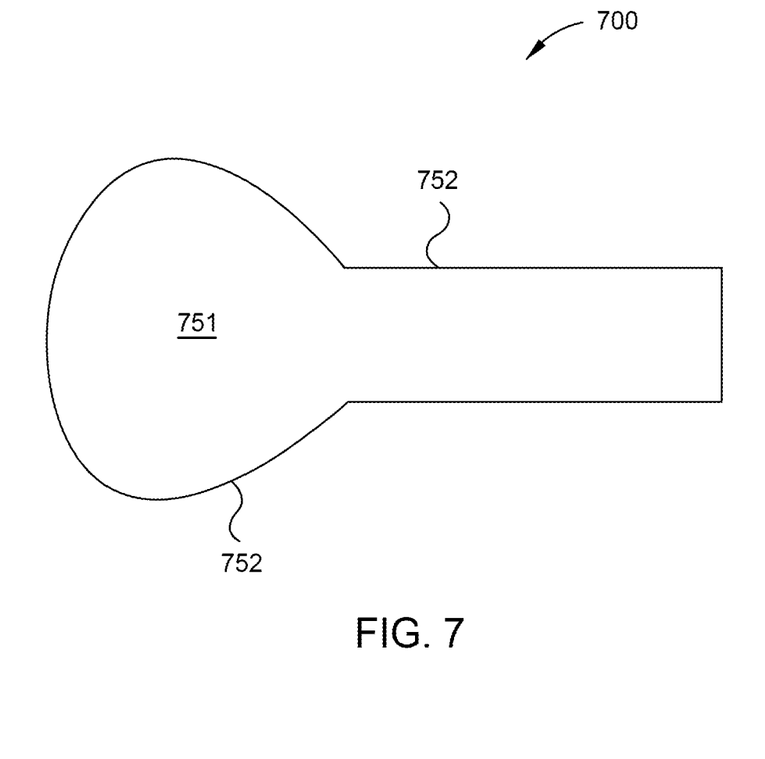
FIG. 7 is a top view of a cut-out section of the optical device from FIG. 1A, according to one embodiment.

FIG. 7 is a top view of a cut-out section 700 (hereafter referred to as "the section 700") of the optical device 50 from FIG. 1A, according to one embodiment. The section 700 includes a top surface 751 and edges 752. The size and shape of the section 700 has been modified relative to the size and shape of the optical device 50. First, the size of the section 700 is substantially smaller (e.g., 25% smaller, 50% smaller, 75% smaller, 90% smaller) than the optical device 50. This reduced size of the section 700 reduces the distance the light, for example the light L provided by the metrology system 200 of FIG. 2A, travels inside the section 700 before the light encounters one of the edges 752 compared to the distance light travels inside the optical device 50 before reaching an edge 52. Secondly, the shape of section 700 is modified relative to the shape of the optical device 50 to increase the proportion of total surface area belonging to surface area of the edges 752 compared to the proportion of the total surface area belonging to the edges 52 of the optical device 50.

Thus, the smaller section 700 with reduced distance to the edges 752 and a higher proportion of edge surface area increases the amount of edge interaction, the light has in the section 700 compared to the optical device 50. This increased interaction with the edges 752 can be used to amplify the differences that different coatings have on the light measured at block 1010 after the edges of the optical device are coated. Therefore, in some embodiments, the method 1000 described above in reference to FIG. 6 is performed on cut-out sections like the section 700 to increase the interaction of the light with the edges of the optical device. For example, the measurements made at block 1004 can be performed on the section 700 without any coated edges, and measurements at block 1010 can be performed after some or all of the edges 752 of the section 700 have been coated.

The method can then be repeated using other sections that are identical to the section 700 except for the coating that is added to the section 700 between blocks 1004 and 1010, so that the effectiveness of the different coatings on the sections can be determined. As this method is repeated, the shape of the sections (e.g., section 700) (also referred to as optical devices) are modified (i.e., from the shape of the optical device 50 to the shape of section 700) before the first type of light (e.g., blue light) is provided to the sections. The optical device 50 can have a shape that is substantially the same as the shape that the waveguide combiner will have as a component in a finished product while the section 700 is not a shape of a component to be included in a finished product.

Coating the edges of optical devices with an optically absorbent coating can improve the performance of these optical devices. For example, the performance of the optical device 50 described above can be improved when the uncoated edges 52 are coated with an optically absorbent coating to form the coated (e.g., blackened) edges 55. These coated edges 55 reduce the amount of light transmitted through the coated edges 55 relative to corresponding uncoated edges and also reduce the amount of light transmitted from other locations where it is undesirable to transmit light, such as location 51A on the top surface of the waveguide combiners described above. Although, coated edges, such as the coated edge 55 can improve the performance of these optical devices (e.g., improving image quality output from a waveguide combiner), there can be substantial variability in the performance among different coatings used to darken an edge of an optical device. Furthermore, there can variability for the same coating when that coating is used on different devices. Consequently, it can be challenging to determine which coating should be used for which optical device. Conventional methods have generally focused on analyzing the quality of the output of the optical device. For example, for waveguide combiners the conventional has been to focus on the quality of the images output by the waveguide combiner, but there are numerous variables that can affect this image quality.

The methods and systems described above address these problems by quantifying how effective different coatings are at reducing light transmitted from undesirable locations (e.g., the edges and locations on top or bottom surface at locations other than the location of the intended optical output, such as location 51A on the top surface 51 described above). This reduction in transmitted light is quantified by using the same cameras take the same measurements before and after edge-coating is performed. The difference in these measurements before and after edge-coating is related to the reduction in the transmitted light. By performing the same measurements—before and after edge-coating—on multiple optical devices that are identical except for the coating applied to the edges, the measurements can be used to determine the coatings that perform better than other coatings for reducing the unintended transmitted light.

While the foregoing is directed to embodiments of the present disclosure, other and further embodiments of the disclosure may be devised without departing from the basic scope thereof, and the scope thereof is determined by the claims that follow.

What is claimed is:

1. A method of optical device metrology comprising:
   a) providing a first type of light into a first optical device during a first time period, the first optical device comprising a top surface, a bottom surface, and one or more edges connecting the top surface with the bottom surface;
   b) measuring a quantity of the first type of light transmitted from a first location on the top surface or the bottom surface during the first time period;
   c) measuring a quantity of the first type of light transmitted from a second location during the first time period;
   d) coating at least a portion of an edge of the one or more edges with a first coating of optically absorbent material during a second time period that occurs after the first time period;
   e) providing the first type of light into the first optical device during a third time period that occurs after the second time period;
   f) measuring a quantity of the first type of light transmitted from the first location on the top surface or the bottom surface during the third time period; and
   g) measuring a quantity of the first type of light transmitted from the second location during the third time period.

2. The method of claim 1, further comprising repeating blocks a-g) for a second optical device having the same shape and size as the first optical device, wherein the second optical device is coated with a second coating instead of the first coating.

3. The method of claim 2, wherein the second coating is a different material than the first coating.

4. The method of claim 2, further comprising
   h) determining the first coating or the second coating is better suited for absorbing light based on the measurements made during blocks b) and f) for the first optical device and the second optical device.

5. The method of claim 4, further comprising coating additional optical devices with the first coating or the second coating based on the determination at block h).

6. The method of claim 2, wherein a shape of the first optical device and the second optical device is modified before the first type of light is provided to the first optical device and the second optical device.

7. The method of claim 6, wherein, before the modification, the first optical device and the second optical device have a size and shape substantially corresponding to a size and shape that the first optical device and the second optical device would have in a finished product.

8. The method of claim 2, wherein
the first type of light is provided to a plurality of gratings of the first optical device during the first time period, and
the first type of light is provided to a plurality of gratings of the second optical device during the first time period.

9. The method of claim 1, wherein the first type of light is blue light provided from a laser.

10. The method of claim 1, further comprising measuring a quantity of the first type of light transmitted from a location on an edge of the one or more edge during the first time period and the third time period.

11. The method of claim 1, wherein
the first type of light is provided to a location on the bottom surface of the first optical device during the first time period, and
the first type of light is provided to the location on the bottom surface of the first optical device during the third time period.

12. The method of claim 1, wherein
the first type of light is provided to a location on an edge of the one or more edges of the first optical device during the first time period, and
the first type of light is provided to the location on the edge of the one or more edges of the first optical device during the third time period.

13. The method of claim 1, further comprising simultaneously performing blocks a-g) for a second optical device having the same shape and size as the first optical device, wherein the second optical device is coated with a second coating instead of the first coating.

14. A method of optical device metrology comprising:
a) providing a first type of light into a first optical device during a first time period, the first optical device comprising a top surface, a bottom surface, and one or more edges connecting the top surface with the bottom surface;
b) measuring, by a first camera, a quantity of the first type of light transmitted from a first location on the top surface or the bottom surface during the first time period;
c) coating at least a portion of an edge of the one or more edges with a first coating of optically absorbent material during a second time period that occurs after the first time period;
d) providing the first type of light into the first optical device during a third time period that occurs after the second time period;
e) measuring, by the first camera, a quantity of the first type of light transmitted from the first location on the top surface or the bottom surface during the third time period; and
f) measuring, by a second camera, a quantity of the first type of light transmitted from a first location on an edge of the one or more edges during the first time period and the third time period.

15. The method of claim 14, further comprising repeating blocks a-f) for a second optical device having the same shape and size as the first optical device, wherein the second optical device is coated with a second coating instead of the first coating.

16. The method of claim 15, further comprising
g) determining the first coating or the second coating is better suited for absorbing light based on the measurements made during blocks b) and e) for the first optical device and the second optical device.

17. The method of claim 14, further comprising repeating blocks a-e) and f) for a second optical device having the same shape and size as the first optical device, wherein the second optical device is coated with a second coating instead of the first coating.

18. A method of optical device metrology comprising:
a) providing a first type of light into a first optical device during a first time period, the first optical device comprising a top surface, a bottom surface, and one or more edges connecting the top surface with the bottom surface;
b) measuring, by a first camera, a quantity of the first type of light transmitted from a first location on the top surface or the bottom surface during the first time period;
c) measuring, by a second camera, a quantity of the first type of light transmitted from a first location on an edge of the one or more edges during the first time period;
d) coating at least a portion of an edge of the one or more edges with a first coating of optically absorbent material during a second time period that occurs after the first time period;
e) providing the first type of light into the first optical device during a third time period that occurs after the second time period;
f) measuring, by the first camera, a quantity of the first type of light transmitted from the first location on the top surface or the bottom surface during the third time period
g) measuring, by the second camera, a quantity of the first type of light transmitted from the first location on the edge of the one or more edges during the third time period; and
h) determining the first coating or the second coating is better suited for absorbing light based on the measurements made during blocks b), c), f), and g) for the first optical device and the second optical device, wherein the measurements made by the first camera are weighted more heavily than the measurements made by the second camera for determining which coating is better suited.

* * * * *